United States Patent [19]
Rumreich et al.

[11] Patent Number: 6,097,442
[45] Date of Patent: Aug. 1, 2000

[54] METHOD AND APPARATUS FOR REFORMATTING AUXILIARY INFORMATION INCLUDED IN A TELEVISION SIGNAL

[75] Inventors: Mark Francis Rumreich; Mark Robert Zukas, both of Indianapolis, Ind.

[73] Assignee: Thomson Consumer Electronics, Inc., Indianapolis, Ind.

[21] Appl. No.: 08/769,332

[22] Filed: Dec. 19, 1996

[51] Int. Cl.[7] .................................................. H04N 5/445
[52] U.S. Cl. ........................... 348/563; 348/564; 348/589
[58] Field of Search ................................... 348/563, 564, 348/565, 569, 586, 588, 589, 596, 600, 468; H04N 5/445, 5/45

[56] References Cited

U.S. PATENT DOCUMENTS 4,430,671  2/1984  Tamer .
5,233,423  8/1993  Jernigan .
5,500,680  3/1996  Lee .
5,680,176  10/1997  Cho .......................................... 348/564

FOREIGN PATENT DOCUMENTS 0489387  6/1992  European Pat. Off. ........ H04N 7/087
0536828  4/1993  European Pat. Off. ........ H04N 7/087

OTHER PUBLICATIONS

PCT International Search Report dated Apr. 29, 1998.

Primary Examiner—Sherrie Hsia
Attorney, Agent, or Firm—Joseph S. Tripoli; Peter M. Emanuel; David T. Shoneman

[57] ABSTRACT

A method and apparatus for reformatting auxiliary information such as closed caption text that is extracted from a television signal. The apparatus reformats the text by removing redundant spaces, reorganizing the text to fit into an arbitrary sized closed caption window, converting any closed caption display mode (e.g., pop on, paint on or roll up) into a modified roll on display, and inserting speaker identifier prompts into the caption.

16 Claims, 4 Drawing Sheets

METHOD AND APPARATUS FOR REFORMATTING AUXILIARY INFORMATION INCLUDED IN A TELEVISION SIGNAL

CROSS REFERENCE TO RELATED APPLICATIONS

This application is related to the following commonly-assigned U.S. patent applications: Ser. No. 08/770,770 (Attorney Docket No. RCA 88,200) entitled "METHOD AND APPARATUS FOR POSITIONING AUXILIARY INFORMATION PROXIMATE AN AUXILIARY IMAGE IN A MULTI-IMAGE DISPLAY", Ser. No. 08/769,329 (Attorney Docket No. RCA 88,231) entitled "TELEVISION APPARATUS FOR SIMULTANEOUS DECODING OF AUXILIARY DATA INCLUDED IN MULTIPLE TELEVISION SIGNALS", Ser. No. 08/769,333 (Attorney Docket No. RCA 88,461) entitled "VIDEO SIGNAL PROCESSING SYSTEM PROVIDING INDEPENDENT IMAGE MODIFICATION IN A MULTI-IMAGE DISPLAY", and Ser. No. 08/769,331 (Attorney Docket No. RCA 88,489), U.S. Pat. No. 5,929,927, entitled "METHOD AND APPARATUS FOR PROVIDING A MODULATED SCROLL RATE FOR TEXT DISPLAY", all of which were filed in the name of Mark F. Rumreich et al. on the same date as the present application.

FIELD OF THE INVENTION

The invention relates to systems for generating signals suitable for producing a multi-image display having a main image and an auxiliary image, such as picture-in-picture (PIP) and picture-outside-picture (POP) displays. More particularly, the invention relates to a method and apparatus for reformatting auxiliary information included in a television signal, such as closed caption text, such that auxiliary information associated with an auxiliary image can be positioned proximate the auxiliary image.

BACKGROUND

Television signals may include an auxiliary information signal component representing information other than the video and audio program components of a television program. For example, in the United States, NTSC (National Television Standards Committee) television signals can include closed caption information. When decoded and displayed, closed captioning provides a visible text representation of a television program's audio content. The auxiliary information signal component representing closed caption data comprises two bytes of binary closed caption data during the latter half of each occurrence of line 21 of field 1. Additional closed caption data and similarly encoded information, such as extended data services information (XDS), may be included in other line intervals such as line 21 of field 2. United States law requires caption decoders in all television receivers having cathode ray tubes (CRT) larger than 13 inches. Therefore, most programs (video tapes included) now include captioning data.

Although captioning was developed to aid the hearing impaired, captioning can also provide a benefit to non-hearing impaired viewers as well. Providing captioning for an auxiliary image in a multi-image display, such as picture-in-picture (PIP) or picture-outside-picture (POP) displays, is an example of this type of additional benefit. For example, activating a PIP feature produces a small image representing the content of a PIP program signal to be displayed in a portion of the main picture. However, only the audio program associated with the main picture is processed and coupled to the speakers of the television. The audio content of the PIP signal is lost. Because the audio program is important to the comprehension of a television program, the usefulness of the PIP feature is severely limited by the lack of an associated audio program. An approach to solving this problem is to display captions, i.e., visible text, representing the PIP audio programming portion of the display. However, the closed caption decoder in most television receivers processes only the caption information associated with the main picture, not the PIP signal.

An exception to this general rule is found in certain television receivers manufactured by Sharp Corporation such as model 31HX-1200 and 35HX-1200. These Sharp television receivers display captions representing the audio associated with the PIP image by providing switching capability that permits coupling of the PIP signal to the main caption decoder. PIP captions are displayed full size (up to 4 rows of 32 large characters) at the top or bottom of the screen (a user selectable position). An example of PIP captioning used by Sharp television receivers is shown in FIG. 1 which depicts a multi-image display including main image 100, PIP image 102 and PIP caption 104.

SUMMARY OF THE INVENTION

The invention resides, in part, in the inventors' recognition of a number of problems associated with the described PIP captioning implementation. First, main-picture captioning and small-picture captioning cannot be displayed simultaneously. Second, the small image combined with the caption display for the small image may obscure the main image to an extent that is objectionable to a user. For example, a PIP caption as in the Sharp implementation (up to 20% of the screen area) combined with a normal size PIP image (one-ninth of the screen area) may obscure more than 30% of the main video display. Third, the small-picture caption is difficult to follow simultaneously with small-picture video because the location of the caption at the top or bottom of the screen is physically disconnected from the small picture and may be a significant distance from the small picture. Fourth, the appearance of small-picture captions is virtually identical to main-picture captions causing users to become confused as to which image is associated with the caption. The combination of these problems may make auxiliary-picture captioning that is implemented in the manner described above objectionable to an extent that renders auxiliary-picture captioning useless for many viewers.

The invention also resides, in part, in providing a method and apparatus for reformatting auxiliary information included in an auxiliary video signal such that the auxiliary information can be displayed legibly in a location proximate an auxiliary image in a multi-image display, such as a picture-in-picture (PIP) display. In accordance with another aspect of the invention, Reformatting of closed caption information comprises removing redundant spaces, reorganizing the text to fit into an arbitrary sized closed caption window, converting any closed caption display mode (e.g., pop on, paint on or roll up) into a particular display mode, e.g., modified roll up display, and inserting speaker identifier prompts into the caption.

In accordance with other aspects of the invention, a data interpreter comprises a status detector, a control code processor, an address generator, a new-speaker identifier, a character mapper, a formatting FIFO, and a buffer memory. When two new closed caption characters (a character pair)

are received, they are first processed by the status detector. The status detector decides which caption mode is being received, whether to keep the characters and if either of the characters is a control code. The two characters are then processed by the control code processor which decides, in response to the control codes (if any), if a carriage return needs to be inserted into the reformatted caption. Concurrently, the characters are coupled one at a time through the new-speaker identifier, character mapper, and the formatting FIFO. During these three stages, any new speakers are identified, characters are re-mapped to a new character set, and redundant spaces are removed from the character stream. Finally, the address generator constructs the reformatted caption in the buffer memory and writes the caption to a circular buffer. The circular buffer is accessible by the display generation hardware such that a comprehensive, closed caption text display is generated that has a format different from that of the standard closed caption text format.

BRIEF DESCRIPTION OF THE DRAWING

The teachings of the present invention can be readily understood by considering the following detailed description in conjunction with the accompanying drawings, in which.

To facilitate understanding, identical reference numerals have been used, where possible, to designate identical elements that are common to the figures.

DETAILED DESCRIPTION

Figure 1:
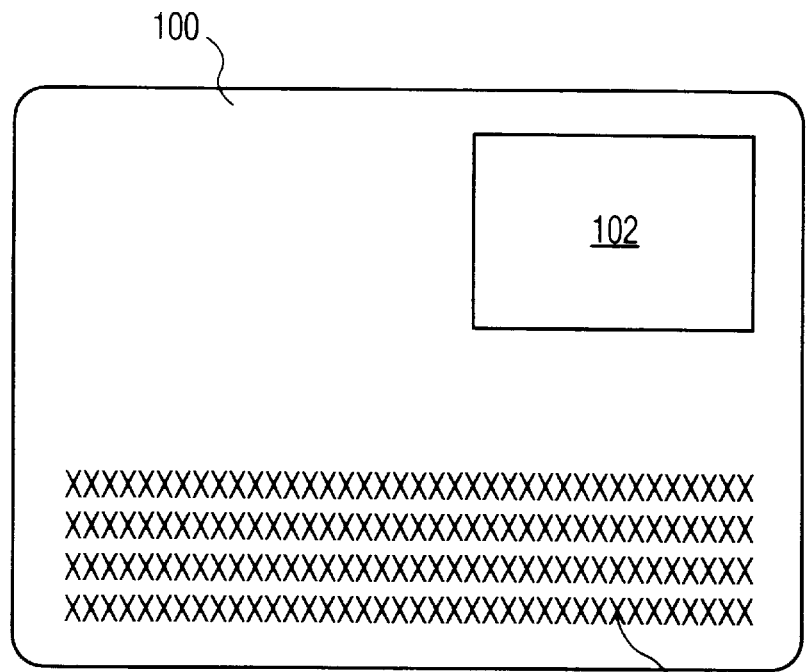
FIG. 1 depicts a PIP captioning orientation as implemented in the prior art.
Figure 2:
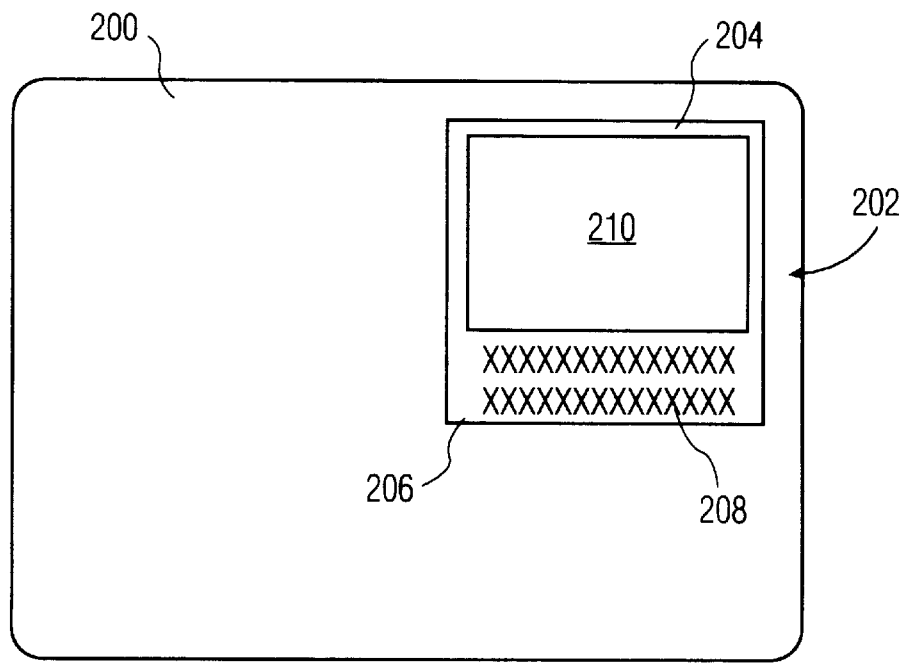
FIG. 2 depicts the orientation of the PIP closed caption information positioned proximate the PIP image.

FIG. 2 depicts a multi-image display produced by an exemplary picture-in-picture (PIP) system. The display shown in FIG. 2 includes a PIP image region 202 produced in response to an auxiliary video signal and a main picture 200 produced in response to a main video signal. PIP image region 202 comprises an active PIP video region 210 representing a video signal component of the auxiliary video signal and auxiliary information 208, such as closed caption text, that is extracted from an auxiliary information component of the auxiliary video signal. The active region 210 of the PIP image 202, where the PIP video is displayed, has a typical dimension of one-third by one-third of the size of the main picture 200. In the exemplary embodiment, region 208 represents closed caption text extracted from auxiliary information included in the auxiliary video signal. PIP caption 208 is positioned proximate the PIP video region 210 within an extension 206 of a border region 204 that circumscribes PIP video region 210.

In the "normal" operating mode, i.e., when PIP captioning is disabled, border region 204 is approximately 0.25 inches (0.64 cm) wide on all sides of active PIP video area 210. Upon activation of PIP captioning, the bottom portion of border area 204 is extended to a height of approximately 2 inches (5 cm) to produce border extension 206 (also referred to herein as a "window") in which PIP captioning is displayed. PIP captioning 208 comprises 2 lines of closed caption text. It should be noted that the system positions PIP caption 208 proximate active PIP video region 210 while the position of PIP image 202 within the confines of the main picture 200 is conventionally defined by a user. For example, using PIP control buttons on a remote control, a user defines a vertical line number (vertical position) and a pixel location (horizontal position) where one corner (e.g., upper left corner) of the PIP image is to be located. A system for producing extended border region 206 and for positioning auxiliary information 208 within the border region proximate the auxiliary video image 210 is described in commonly assigned U.S. patent application Ser. No. 08/770,770 (Attorney Docket No. RCA 88,200) entitled "METHOD AND APPARATUS FOR POSITIONING AUXILIARY INFORMATION PROXIMATE AN AUXILIARY IMAGE IN A MULTI-IMAGE DISPLAY" that was filed in the name of Mark F. Rumreich et al. on the same date as the present application and is incorporated herein by reference.

The closed caption text 208 contains reformatted closed caption characters. Reformatting may involve mapping the received closed caption characters into a character set different than that typically used for closed caption characters (such as upper case characters only), reducing character size, and displaying only 2 rows of 18 characters. Consequently, the PIP captioning window displays 36 characters simultaneously. Such caption organization facilitates viewer comprehension and minimizes main picture obstructions. In contrast, a closed captioning standard EIA-608 specifies a display character grid of 15 rows by 32 columns with up to four rows of characters being displayed at any one time. Closed caption information included in an auxiliary video signal includes display format information that defines an intended display format for the closed caption information in accordance with the EIA-608 standard. Thus, auxiliary information included in the auxiliary video signal specifies one display format and, as explained in detail below, the auxiliary information is reformatted to produce a second display format such as that shown in FIG. 2, i.e., a display format other than that specified by the auxiliary information.

Figure 3:
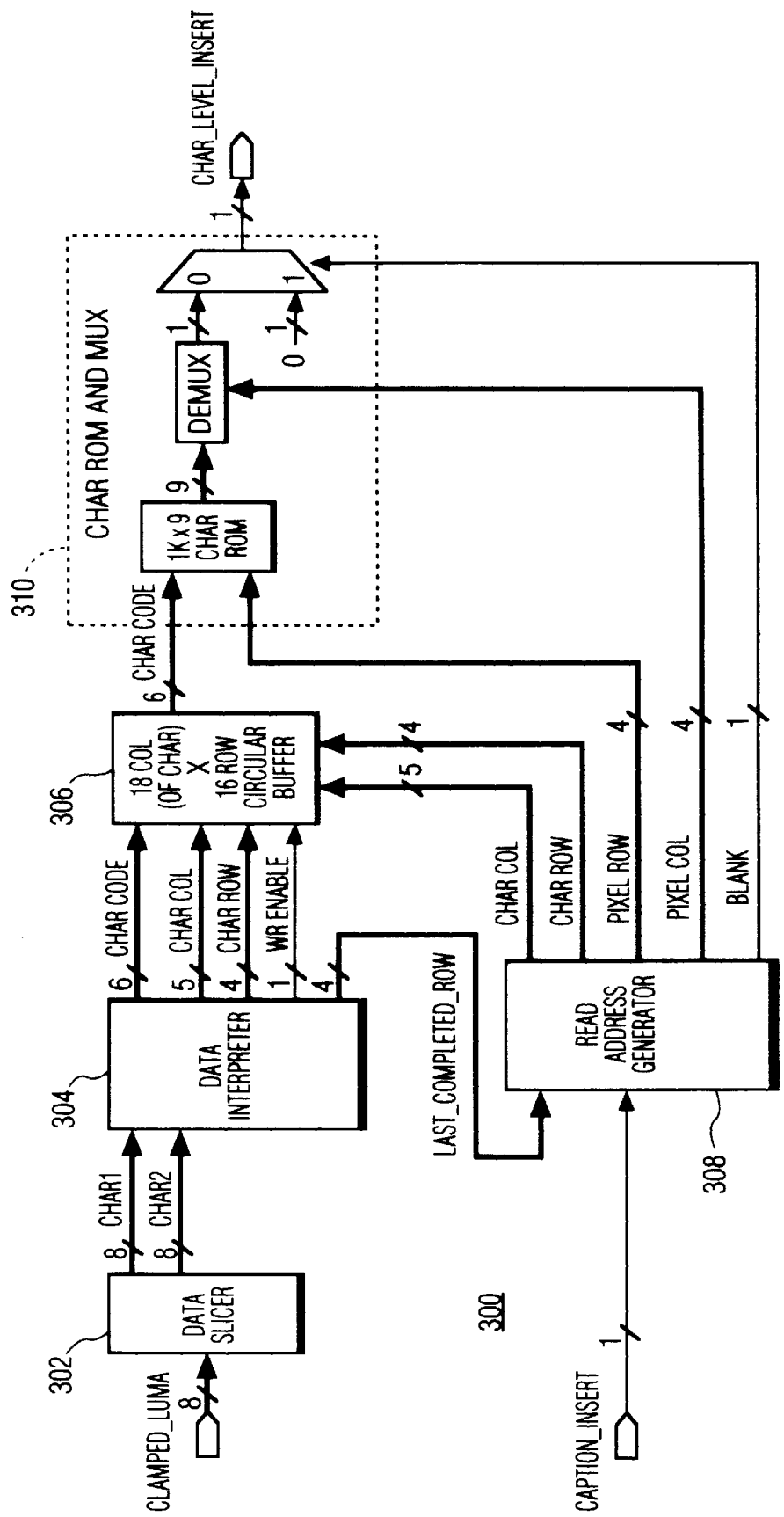
FIG. 3 depicts a block diagram of circuitry for generating closed caption text proximate the PIP image.

FIG. 3 depicts a closed caption text processor 300 containing a data interpreter 304 of the present invention. The closed caption text processor 300 further contains a data slicer 302, a circular buffer 306, read address generator 308, and a character processor 310. The data slicer 302 conventionally operates to extract a closed caption character pair (CHAR1 and CHAR2) from each frame of a television signal. The character pair is coupled to the data interpreter 304. The interpreter 304 reformats the closed caption characters by reducing the number of possible characters, reformatting the position of carriage returns in the caption, inserting a caption start prompt, and the like. The details of the reformatting process are disclosed with respect to FIG. 4 below. The output of the data interpreter is a sequence of character codes representing the characters of the caption as well as a write address (CHAR COL and CHAR ROW) for temporarily storing the character codes in the circular buffer.

The character codes are stored in the circular buffer 306 as N rows and M columns of character storage locations. For the PIP application, the circular buffer is 16 rows by 18 columns. The read address generator 308 extracts the character codes from the circular buffer at a rate that varies with buffer fullness. An illustrative method and apparatus for accessing the circular buffer 306 using a variable rate is disclosed in commonly assigned U.S. patent application Ser. No. 08/769,331 (Attorney Docket No. RCA 88,489), U.S. Pat. No. 5,929,927, entitled "METHOD AND APPARATUS FOR PROVIDING A MODULATED SCROLL RATE FOR TEXT DISPLAY" that was filed in the name of Mark F. Rumreich et al. on the same date as the present application and is incorporated herein by reference. The recalled character codes are processed in the character processor to generate a control signal for inserting characters proximate the PIP image in accordance with the teachings of the U.S. patent application Ser. No. 08/770,770 (Attorney Docket No. RCA 88,200) referred to above.

Figure 4:
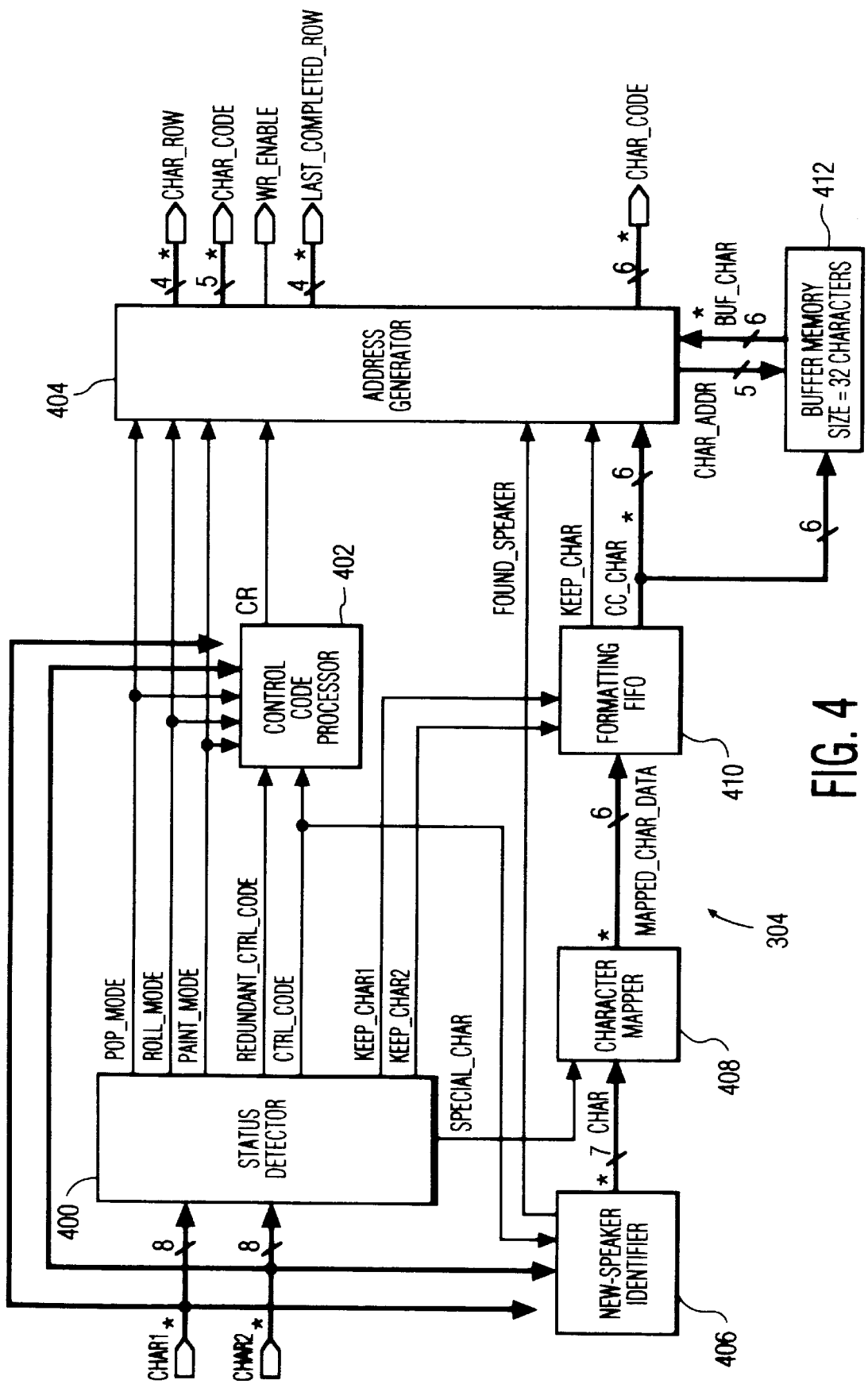
FIG. 4 depicts a block diagram of a data interpreter.

FIG. 4 depicts a block diagram of the data interpreter 304 of the present invention. The data interpreter 304 contains a status detector 400, control code processor 402, address generator 404, new-speaker identifier 406, character mapper 408, formatting FIFO 410, and buffer memory 412. This combination of elements reformats the character pair, CHAR1 and CHAR2, into character codes that are associated with write addresses.

The status detector 400 reads the closed caption character pairs and determines whether the characters should be kept, which closed caption mode is being received (e.g., roll up, pop on, or paint on) and whether a special character has been received. The status detector identifies the caption mode by monitoring the caption control codes and produces a flag indicating whether the caption is a pop on, roll up, or paint on caption. The status detector generally operates in accordance with the Closed Caption Decoder Requirements EIA 608, FCC Report and Order, FCC 91-119 section 15,119 parts (g) and (i). The characters to be kept are coupled to the Formatting FIFO 410. The mode identification signals (POP_MODE, ROLL_MODE, and PAINT_ODE) are coupled to the address generator 404 and to the control code processor 402. Also, the redundant control code signal is coupled to the control code processor and the control code itself is coupled to both the processor 402 and the new-speaker identifier 406.

The control code processor 402 analyzes the control codes (e.g., preamble address codes) to determine when to insert carriage returns in the caption. The details of the control code processor 402 are discussed with respect to FIG. 5 below. The output of the control processor is signal (CR) that identifies when a carriage return is to be inserted in the caption. This signal is coupled to the address generator 404.

The new-speaker identifier 406 converts the control codes into displayable spaces and detects new-speaker identifier used to identify a change of speakers in the roll up mode. Specifically, all control code bytes are converted into spaces when the CNTRL_CODE signal is a logic one (i.e., logic one indicates that the present character is a control code). These extra spaces will be removed by the formatting FIFO 410. The speaker identifiers that are typically used to identify speakers in roll up mode are ":", ">", and "[". If such a special text character is found, the new-speaker identifier 406 sets the FOUND_SPEAKER flag. The FOUND_SPEAKER flag is coupled to the address generator 404. Furthermore, the closed caption characters are coupled from the new-speaker identifier 406 to the character mapper 408.

The character mapper 408 converts the input character set into a modified set of characters that, for example, includes a reduced number of characters. For example, character mapper 408 maps both upper and lower case characters into only upper case characters. Character mapper 408 can facilitate other related changes, as needed.

The formatting FIFO 410 removes redundant spaces from the character stream. Specifically, the spaces are removed by setting the KEEP_CHAR signal to logic zero (i.e., delete character) during the following conditions: (1) if a space is detected between a character that is not a space and a question mark, exclamation point, or period, and (2) if any spaces are detected immediately following a space just written to the buffer memory. Condition 2 includes any spaces separated by any characters currently flagged to be removed. The KEEP_CHAR signal and the closed caption character (CC_CHAR) are coupled to the address generator 404. CC_CHAR is also coupled to the buffer memory 412 and stored therein.

The buffer memory 412 is used as a temporary storage for the caption text while the write address generator 404 determines how the caption text is to be formatted. In essence, the buffer memory forms a "work space" for the write address generator. The buffer is addressed by CHA_ADR and the data is provided to the address generator as BUF_CHAR.

The address generator 404 generates a sequence of character codes that define the characters to be displayed in a caption. To fit the caption content in the 18 column width of the caption window for the PIP image, the address generator must insert carriage returns into the text. However, the returns are not positioned where they would break a word. Thus, the address generator monitors when a carriage return would cause a break in a word and it places the return at a previous space. A carriage return is only placed in a word when a word is longer than 18 characters. For each character code, the address generator produces a write address identifying a column and row in which the character code will be stored in the circular buffer. Furthermore, the address generator uses the FOUND_SPEAKER flag to determine when a new speaker is found. If the FOUND_SPEAKER flag is set within N characters of the previous carriage return, a new speaker is assumed to have been found and that previous carriage return is inserted so the new speaker can start on a new line. N is established as an integer representing the longest expected speaker name. Empirical study shows that N equal to eleven is sufficient for most applications. The generator also produces a LAST_COMPLETED_ROW value that indicates the last complete row of text that was stored, e.g., a value from 0 to 15 in a 16 row circular buffer.

To review, when two new closed caption characters are received, they are first processed by the status detector 400. The status detector decides which caption mode is being received, whether to keep the characters and if either of the characters is a control code. The two characters are then processed by the control code processor 402 which decides if a carriage return needs to be inserted into the reformatted caption. Concurrently, the characters are coupled one at a time through the new-speaker identifier, character mapper, and the formatting FIFO. During these three stages, any new speakers are identified, characters are re-mapped to a new character set, and redundant spaces are removed from the character stream. Finally, the address generator 404 constructs the reformatted caption in the buffer memory and writes the caption to the circular buffer.

Figure 5:
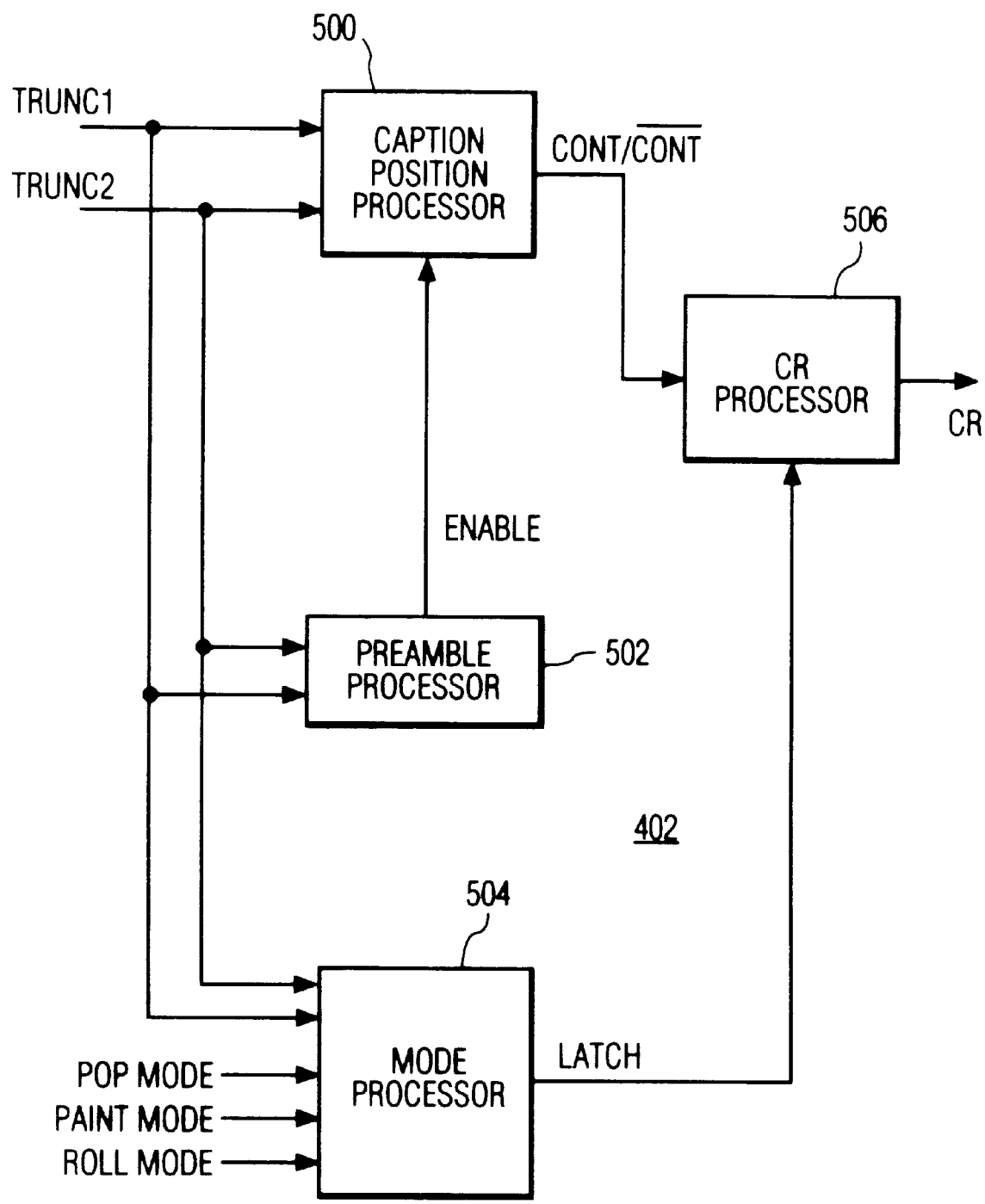
FIG. 5 depicts a block diagram of a control code processor.

FIG. 5 depicts a block diagram of the control code processor 402. The processor 402 contains a caption position processor 500, a preamble processor 502, a mode processor 504, and a carriage return processor 506. The caption position processor 500 determines if the caption characters represent the start of a new caption or text associated with the previous caption. This function is accomplished by decoding the caption position information from the preamble address code (PAC) and comparing it with the previous PAC's position information.

The caption position processor 500 is only enabled to process the last or latest PAC. Therefore, the preamble processor 502 detects the latest control code and operates to disable, via the ENABLE path coupled to the processor 500, the caption position processor 500 for all control codes except the latest.

The mode processor 504 is coupled to the character pair and the caption mode identity signals. The mode processor analyzes the character pair and caption mode signals and produces a latch signal that appropriately latches a carriage return. Additionally, reception of either an end of caption or erase displayed memory control code will automatically cause a carriage return to be generated. The latch signal is coupled to the CR processor 506 which generates a carriage return signal in response to the continuous/not-continuous signal from the caption position processor 500 and the latch signal.

To best understand the technique used to determine if a new speaker or caption is being received, a review of the various modes of closed caption display is warranted.

Closed caption text is displayed using one of three modes: roll up, pop on and paint on. In roll up, the text is typically scrolled onto the bottom center of the screen for all speakers. The speakers are identified by speaker identifiers, e.g., the name of the speaker followed by an identifier character such as :, >, or ]. The caption position decoder is not used during roll up because the speaker detection is performed by the new-speaker identifier discussed above.

The pop on and paint on modes do not use speaker prompts, but rather position the text on the screen proximate the speaker. The text may be positioned simultaneously for all speakers or sequentially, one speaker at a time. For pop on, a caption appears (pops on) below the speaker and, for paint on, the text scrolls onto the screen below the speaker one character at a time. The position of the text is controlled by the caption control codes (e.g., preamble address codes (PACs)). In the pop on and paint on modes, the PACs control positioning of each line of text on the screen.

Without an identifier to identify the speaker in pop on and paint on modes, the control code processor can only reliably detect new captions although there is a high correlation between new captions and new speakers. To detect the new captions, the control code processor must analyze each PAC and determine if the position of the text has substantially changed. If a position change occurs, the control code processor assumes that a new caption, and possibly, a speaker change has occurred and inserts a carriage return. Subsequently, the write address generator will insert a prompt (an "▷" in the exemplary embodiment) to indicate a new caption is starting. The reformatted text scrolls into a single two line by 18 character window positioned proximate the PIP image and has each new caption clearly identified by the prompt.

The caption position processor 500 processes the control codes (TRUNC1 and TRUNC2) to determine the position of the next caption line and identify whether that position is contiguous with the present caption or represents a new caption located somewhere else on the screen. Additionally, the processor monitors for end of caption (EOC) control codes that indicate that new caption data is about to begin.

Specifically, the processor 500 labels the first received PAC (e.g., $PAC_n$) as an anchor PAC and the PAC's associated (x,y) coordinates are saved. The processor 500 continues monitoring the character pairs until another PAC arrives (e.g., $PAC_{n+1}$). The new (x,y) coordinates carried by $PAC_{n+1}$ are compared to the anchor coordinates. If the new coordinates are one row below and within j columns of the anchor PAC, then $PAC_{n+1}$ becomes the anchor PAC. The new row is assumed to be a continuation of the previous row of text and a carriage return will not be generated by the control code processor. If $PAC_{n+1}$ does not meet the criteria, then the new row is assumed to be a new caption (i.e., not continuous). Consequently, the control code processor will insert a carriage return before the new caption and the address generator inserts a new-caption prompt before the new caption. The forgoing process is represented in pseudo-code as follows:

```
A(x,y) ⇐ First PAC of a caption is the anchor PAC
WHILE more PAC's in caption
P(a,b) ⇐ Next PAC of caption
IF P(a,b) ∈A(a=x+1,y–j<b<y+j)
A(x,y)=P(a,b)
ELSE
Insert carriage return (and prompt)
END IF
END WHILE
```

In order to function properly, the routine makes three assumptions: (1) the $PAC_{n+1}$ is always the row below $PAC_n$ if the text is a continuation of a caption and, if not, it is assumed that another caption has started; (2) the caption that starts with the lowest row number, the upper most caption on the screen, is the first caption displayed; and (3) each caption is sent whole in that all the words of one person's speech are sent before the words of another person.

The continuous/not-continuous decision is coupled from the caption position processor 500 to the carriage return (CR) processor 506. The carriage return processor 506 generates a carriage return when the not-continuous signal and a latch signal simultaneously arrive. The latch signal disables generation of the carriage return processor whenever the roll up mode is used. As described above, speaker detection for this mode is handled by the new-speaker identifier. A carriage return is automatically generated and latched whenever a control code indicating end of caption or erase displayed memory is received.

The foregoing described the operation of the invention in the context of an exemplary embodiment in which closed caption information is reformatted for display proximate a PIP image. However, the invention is useful for reformatting auxiliary information for other multi-image display systems such as picture-outside-picture (POP) displays. In addition, the invention may be useful in regard to auxiliary information other than closed captioning, such as text other than closed captioning. Also, the invention is useful for any application requiring reformatted text information. For example, the present invention can be used to display television audio of, for example, news and/or sporting events separate from a television picture. Also, the caption text could be displayed on a "moving message" display where messages are depicted using an array of lights or LEDs. Other forms of text displays could also be used. The invention provides substantial flexibility as to the types of displays that can be used to depict closed caption text.

A further application of this invention is to produce closed caption text for movies shown in a movie theater. The text could be displayed using the data reformatting technique on a special below screen display or on the screen using polarizing techniques such that the text is only observed by viewers wearing special polarizing glasses.

Although various embodiments which incorporate the teachings of the present invention have been shown and described in detail herein, those skilled in the art can readily devise many other varied embodiments that incorporate these teachings.

We claim:

1. Apparatus comprising:

means for processing an auxiliary information signal component of a video signal for producing auxiliary information displayable in a first layout, said auxiliary information having character information and information petaining to the layout of said character information; and means for modifying the layout of said auxiliary information to be displayable in a second layout, said second being different than said first.

2. The apparatus of claim 1 wherein said auxiliary information comprises information representing a sequence of closed caption characters; and wherein the apparatus further comprises:

a status detector for identifying each control code within the sequence of closed caption characters; and means, coupled to said status detector, for identifying a new caption by inspecting each control code and inserting a carriage return prior to the new caption.

3. The apparatus of claim 2 wherein said identifying means further comprises:

a control code processor, coupled to said status detector, for analyzing each control code to determine where the control code directs the closed caption characters to be positioned upon a display screen, and generating a carriage return whenever the control code positions the closed caption characters in a position that is substantially different from a position of previously displayed closed caption characters.

4. The apparatus of claim 3 further comprising means for inserting a new caption identification prompt after the carriage return.

5. The apparatus of claim 2 wherein said identifying means further comprises:

a new-speaker identifier, coupled to said status detector, for comparing each closed caption character in said sequence of closed caption characters to predefined criteria and for generating a control signal if said closed caption character meets said predefined criteria.

6. The apparatus of claim 5 wherein said predefined criteria is a set of special closed caption characters that identify new speakers.

7. The apparatus of claim 2 further comprising a character mapper for mapping each closed caption character into a modified character set.

8. The apparatus of claim 2 further comprising means for removing redundant spaces from said sequence of closed caption characters.

9. Apparatus for reformatting closed caption text containing a sequence of closed caption characters comprising:

a status detector for identifying each control code within said sequence of closed caption characters;

a control code processor, coupled to said status detector, for analyzing each control code to determine where the control code directs the closed caption characters to be positioned upon a display screen, and for generating a carriage return when said closed caption characters are in a position substantially different from a position of previously displayed closed caption characters;

a new-speaker identifier, coupled to said status detector, for comparing each closed caption character in said sequence of closed caption characters to a predefined criteria;

means coupled to said new-speaker identifier for generating a carriage return when one of said closed caption characters is one of a plurality of special closed caption characters and said one of said special closed caption characters occurs within a predefined number of characters from a previous carriage return, and for inserting a new caption identification prompt after a carriage return;

a character mapper, coupled to said new-speaker identifier, for mapping each closed caption character into a modified character set; and means, coupled to said status detector and said character mapper, for removing redundant spaces from said sequence of closed caption characters.

10. A method for reformatting closed caption text containing a sequence of closed caption characters comprising the steps of:

identifying each control code within the sequence of closed caption characters;

inspecting each control code and each closed caption character to identify a new caption or a new speaker; and inserting a carriage return prior to the new caption or new speaker.

11. The method of claim 10 further comprising the steps of:

analyzing each control code to determine where the control code directs the closed caption characters to be positioned upon a display screen; and generating said carriage return whenever a control code positions the closed caption characters in a position that is substantially different from a position of previously displayed closed caption characters.

12. The method of claim 11 further comprising the step of inserting a new caption identification prompt after the carriage return.

13. The method of claim 10 further comprising the steps of:

comparing each closed caption character to predefined criteria; and generating said carriage return if said closed caption character meets said predefined criteria.

14. The method of claim 13 wherein said predefined criteria is one of a set of special closed caption characters that identify new speakers and said predefined criteria occurs within a predefined number of characters from a previous carriage return.

15. The method of claim 10 further comprising the step of a mapping each closed caption character into a modified character set.

16. The method of claim 10 further comprising the step of removing redundant spaces from said sequence of closed caption characters.

* * * * *